United States Patent
Vaccari et al.

(10) Patent No.: US 11,713,751 B2
(45) Date of Patent: Aug. 1, 2023

(54) METHOD OF CALIBRATING A PUMP OUTPUT

(71) Applicant: Precision Planting LLC, Tremont, IL (US)

(72) Inventors: Adam Vaccari, Peoria, IL (US); Brendan O'Rourke, Pekin, IL (US); Ben Schlipf, Tremont, IL (US); Justin McMenamy, Edwards, IL (US)

(73) Assignee: Precision Planting LLC, Tremont, IL (US)

( * ) Notice: Subject to any disclaimer, the term of this patent is extended or adjusted under 35 U.S.C. 154(b) by 296 days.

(21) Appl. No.: 16/951,708

(22) Filed: Nov. 18, 2020

(65) Prior Publication Data

US 2021/0071651 A1 Mar. 11, 2021

Related U.S. Application Data

(63) Continuation of application No. 16/485,001, filed as application No. PCT/US2018/017270 on Feb. 7, 2018, now Pat. No. 10,954,930.

(60) Provisional application No. 62/460,020, filed on Feb. 16, 2017.

(51) Int. Cl.
 *G05B 15/02* (2006.01)
 *F04B 15/00* (2006.01)
 *A01C 23/00* (2006.01)
 *F04B 13/00* (2006.01)
 *G05D 7/06* (2006.01)

(52) U.S. Cl.
 CPC ............ *F04B 15/00* (2013.01); *A01C 23/007* (2013.01); *F04B 13/00* (2013.01); *G05B 15/02* (2013.01); *G05D 7/06* (2013.01); *G05B 2219/45207* (2013.01)

(58) Field of Classification Search
 CPC ........ F04B 13/00; F04B 15/00; F04B 23/025; F04B 51/00; G05B 15/02; G05B 2219/45207; G05D 7/06; A01C 23/007
 See application file for complete search history.

(56) References Cited

U.S. PATENT DOCUMENTS

| | | | |
|---|---|---|---|
| 2015/0115058 A1* | 4/2015 | Wilger | A01G 25/09 239/61 |
| 2016/0015020 A1* | 1/2016 | Needham | A01M 7/0089 239/159 |
| 2016/0136671 A1* | 5/2016 | Kocer | A01M 7/0089 700/283 |

* cited by examiner

*Primary Examiner* — Yuhui R Pan

(57) ABSTRACT

Embodiments of the present disclosure includes a method of calibrating a pump in a system to determine a minimum pump duty cycle needed. The system comprises a pump, a plurality of application lines downstream of the pump, and a flow control device in each application line. The method determines the minimum pump duty cycle to achieve total flow in the system, achieves a minimum pressure in the system, and ensures that the flow control device is not at or beyond a maximum open position.

7 Claims, 2 Drawing Sheets

METHOD OF CALIBRATING A PUMP OUTPUT

RELATED APPLICATIONS

This application is a continuation of U.S. application Ser. No. 16/485,001, filed 9 Aug. 2019, which is a national stage entry of PCT Application No. PCT/US2018/017270, filed 7 Feb. 2018, which claims the benefit of U.S. Provisional Application No. 62/460,020 filed on Feb. 16, 2017 entitled: METHOD OF CALIBRATING A PUMP OUTPUT, all of which are incorporated by reference herein.

TECHNICAL FIELD

Embodiments of the present disclosure relate to a pump flow calibration method.

BACKGROUND

Generally, pump flow can be controlled by measuring fluid flow from a pump and completing a closed-loop feedback system by having the flow meter send a signal to a controller to change the pump output to maintain a specified flow rate.

Control is a problem when the type of pump is unknown, there are downstream flow meters in separate lines from the main pump output line, and the configuration of the system past the pump is unknown.

This can occur, for example, in controlling liquid flow on an agricultural unit, such as the application of a liquid product to a field. There is variability in the type of pump (e.g., diaphragm, piston, centrifugal), the size of plumbing from the pump to individual application units, such as sprayers, and the number of application units on the agricultural unit. In prior systems, there is a flow meter providing control of the pump. The control algorithm can be made robust to keep the flow to each application unit consistent, but speed to respond is slowed because of the robustness.

BRIEF DESCRIPTION OF THE DRAWINGS

The present disclosure is illustrated by way of example, and not by way of limitation, in the figures of the accompanying drawings and in which.

BRIEF SUMMARY

Embodiments of the present disclosure include a method of calibrating a pump in a system that has a plurality of application lines downstream of the pump with flow control devices in each application line to achieve a selected total flow and a sufficient pressure at each flow control device.

DETAILED DESCRIPTION

The description provided below is for fluid flow on an agricultural unit, such as a planter row unit, sprayer, or sidedress bar. The method is not limited to these applications but covers other fluid applications that have the same configuration.

Figure 1:
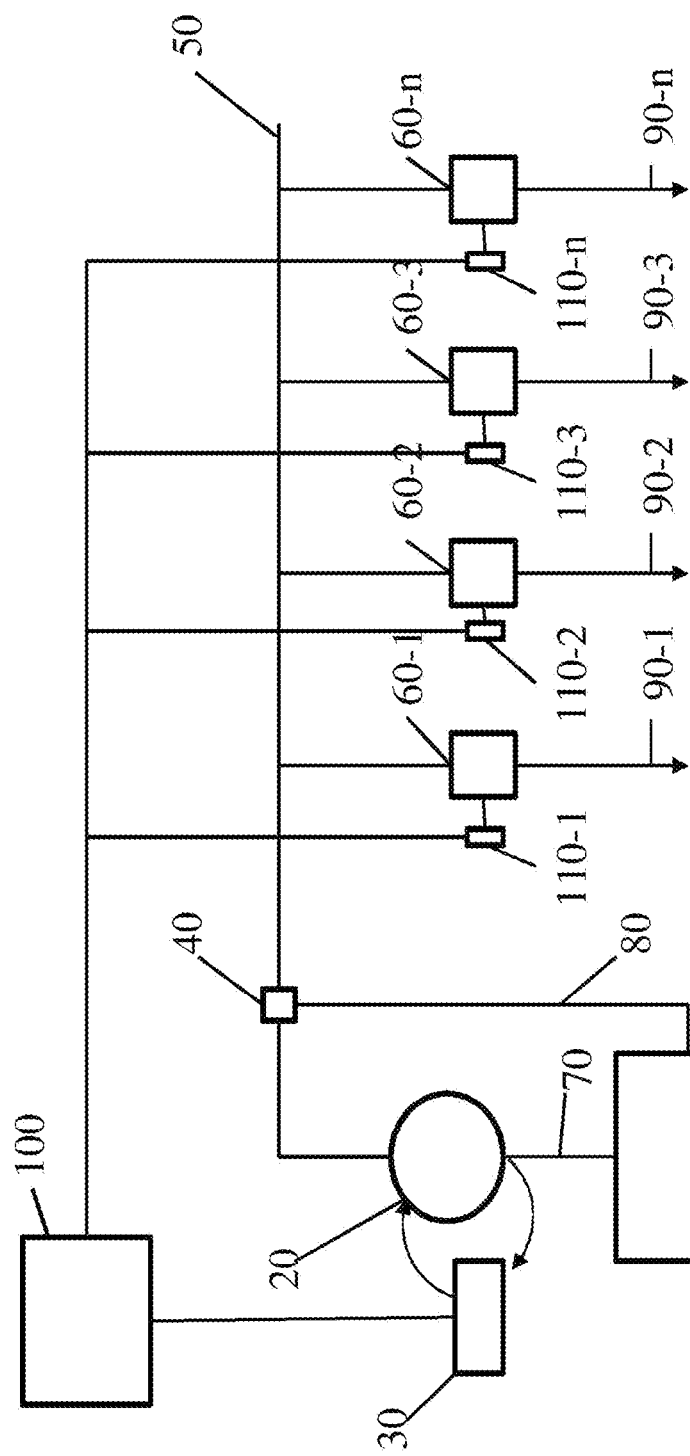
FIG. 1 shows a schematic layout of a fluid flow system in accordance with one embodiment that includes a pump for providing fluid to individual application lines that each have a flow control device.

Provided is a method of calibrating a pump to generate a relationship between percent duty cycle of the pump to total flow from the pump. FIG. 1 illustrates an embodiment of a pump system that has a plurality of application lines. Fluid storage 10 provides fluid through line 70 to pump 20. Pump 20 outputs fluid to line 50. Optionally, there is a pressure relief valve or bypass flow valve 40 in line 50 returning fluid via line 80 to fluid storage 10. Pressure relief valve can have a variable setting to ensure that pressure is not too great. Controller 30 reads the pump output, such as pressure, to generate a PWM (pulse width modulation) signal to the pump to control pump output to a set point provided to controller 30. There is at least one application line 90 supplied by line 50. There is a flow control device 60 in each application line. A monitor 100 is in communication with controller 30. Each flow control device can be in direct communication with monitor 100, or flow control device 60 can be in communication with a row controller 110, which is then in communication with monitor 100.

In one embodiment, the flow control device 60 is the control and monitoring unit described in PCT Application No. PCT/US2016/52957, filed 21 Sep. 2016, which is incorporated herein by reference.

The method is useful when the type of pump is not known and the configuration of the system is different for each installation. Configuration can be different because of the type of pump, the plumbing sizes, pressure relief settings, and configuration and the number of application lines. The method allows for controlling total pump 20 output to work with flow control devices 60 on each application line 90. To be able to fine tune flow in each application line 90, it is desired that each flow control device 60 not be operating at or beyond a maximum open position so that flow control device 60 can be opened and closed more to provide fine tuned flow.

The method includes a step of determining a maximum and minimum total flow through all application lines 90. In the agricultural unit embodiment, the flow rates are determined by input from an operator for the volume to apply for a specified area at a specified speed. For example, if the operator wants to apply at a range of 15 gallons of fluid per acre while traveling at 8 mph (0.014 liter/m$^2$ traveling at 12.8 kph) to 3 gallons of fluid per acre while traveling at 3 mph (0.0028 liter/m$^2$ traveling at 4.8 kph), this is combined with the configuration of the agricultural unit (e.g., the area of application based on the number of application lines 90 on the agricultural unit) to calculate the total flow rate needed (volume/time) to apply at the minimum and maximum application rates.

The duty cycle of pump 20 is stepped by sending a signal from controller 30 to pump 20 and then measuring the total flow through flow control devices 60 until the selected maximum flow rate is achieved. In an illustrative embodiment, the duty cycle of pump 20 can be stepped in 10% of pump cycle increments or any other stepped percentage. The percent duty cycle that provides the selected targeted (maximum) flow rate can be stored in memory in a monitor 100.

Next, pressure at each flow control device 60 is measured to make sure that there is sufficient pressure to be able to maintain flow. If pressure is too close to zero, then any fluctuations in pump 20 output may cause the total flow to be less than a specified amount. For example, it may be desired to have a minimum pressure of 6 psi (41.4 kPa). Cycling of the pump 20 is continued until the target pressure is achieved. The duty cycle for the targeted (maximum) flow rate can then be stored in memory in monitor 100.

Next, the position of flow control devices 60 are determined to make sure that the flow control devices 60 are not at or beyond a maximum open position (e.g., one or more valves may allow a flow control device to be opened beyond a maximum open position). Having the flow control devices 60 open to less than a maximum open position allows for the flow control device 60 to be adjusted open and closed to fine tune the flow.

The above process in lines 13-28 is repeated for minimum flow rate. The duty cycle for the targeted (minimum) flow rate can then be stored in memory in monitor 100.

Figure 2:
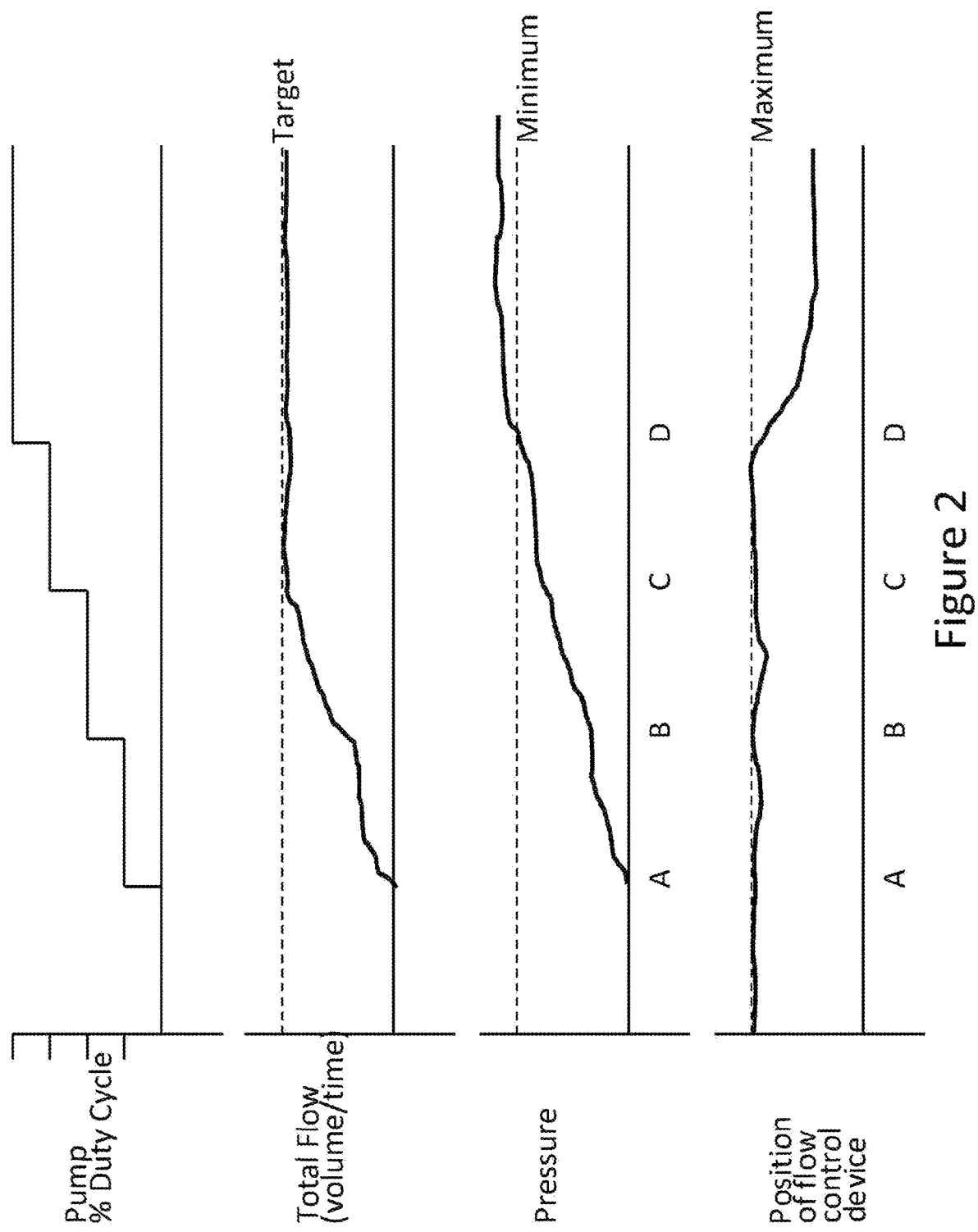
FIG. 2 illustrates changes in total flow and pressure at different pump duty cycles in accordance with one embodiment.

This process can be visualized in FIG. 2. At point A, the first step of pump duty cycle is started. It can be seen that the targeted flow rate (the maximum or minimum) is not achieved, so the pump duty cycle is stepped again at point B. The total flow rate is achieved with this duty cycle, but the minimum pressure is not achieved. At point C, the duty cycle is stepped again, and the minimum pressure is then achieved. At point D, the duty cycle is stepped again until the position of flow control device 60 is not at or beyond a maximum open position.

By determining flow, minimum pressure, and flow control devices 60 not at or beyond a maximum open position, pump 20 output then achieves a general output that is then fine controlled by flow control device 60. Once the calibration is completed, there is no need to run the calibration again until there is a change in the system, such as changing the pump, changing the pressure relief, changing the size or configuration of the plumbing, or the number of application lines 90. This calibration determines the minimum duty cycle of the pump needed to achieve each of total flow, minimum pressure, and flow control devices 60 not at or beyond a maximum open position. This extends the life of the pump by not running the pump at maximum and increases the efficiency of the entire system.

Once the minimum and maximum flow rates are known at the specified duty cycles, this creates a linear relationship between duty cycle to total flow rate. A flow rate above the maximum or below the minimum can be extrapolated from this linear relationship.

The calibration can be conducted with any fluid, such as the fluid intended to be supplied to application lines 90, or water can be used.

In one embodiment, an example 1 includes a method of calibrating a pump in a system. The system comprises a pump, a plurality of application lines downstream of the pump, and a flow control device in each application line. The method comprises adjusting pump duty cycle until a desired total flow rate in the system is achieved, checking pressure at the flow control devices of the plurality of application lines, and if pressure is not above a minimum pressure for the flow control devices, adjusting pump duty cycle until minimum pressure is achieved for each flow control device. The method further includes checking for an amount that each flow control device is open, and if any flow control device is at or beyond maximum open position, adjusting the pump duty cycle until each flow control device is not at or beyond a maximum open position.

An example 2 includes the subject matter of the example 1, wherein the method determines duty cycle for the desired total flow rate that is a maximum flow rate.

An example 3 includes the subject matter of the example 2, wherein determining the duty cycle comprises a calibration to determine a minimum duty cycle of the pump needed to achieve the desired total flow rate, a minimum pressure for each flow control device, and each flow control device not being at or beyond a maximum open position.

An example 4 includes the subject matter of any of the previous examples, wherein adjusting pump duty cycle until a desired total flow rate in the system is achieved comprises increasing the pump duty cycle.

An example 5 includes the subject matter of the example 1, wherein checking pressure at each flow control device comprises measuring pressure at each flow control device to determine whether sufficient pressure is available at each flow control device to be able to maintain flow.

An example 6 includes the subject matter of any of the previous examples, wherein the minimum pressure of each flow control device is approximately 5-7 psi (e.g., 6 psi).

An example 7 includes the subject matter of any of the previous examples, wherein the pump duty cycle is adjusted until each flow control device is open to less than maximum to allow for each flow control device to be adjusted open and closed to fine tune the flow rate.

An example 8 includes the subject matter of the example 1 and further comprises adjusting pump duty cycle until a desired total minimum flow rate in the system is achieved.

An example 9 includes the subject matter of example 8 and further comprises checking pressure at each flow control device of the plurality of application lines, and if pressure is below a minimum pressure for each flow control device, adjusting pump duty cycle until minimum pressure is achieved for each flow control device.

An example 10 includes the subject matter of the example 9 and further comprises checking for an amount that each flow control device is open and if any flow control device is at or beyond a maximum open position, adjusting pump duty cycle until each flow control device is not at or beyond a maximum open position in order to determine duty cycle for minimum flow rate.

An example 11 includes the subject matter of the example 10, wherein determining the duty cycle comprises a calibration to determine a minimum duty cycle of the pump needed to achieve each of the desired total minimum flow rate, a minimum pressure for each flow control device, and each flow control device not being at or beyond a maximum open position.

An example 12 includes the subject matter of any of the previous examples, wherein the system controls the duty cycle of the pump to apply fluid to a field for an agricultural fluid application An example 13 includes the subject matter of the example 8, wherein adjusting pump duty cycle until a desired total minimum flow rate in the system is achieved comprises increasing the pump duty cycle.

In another embodiment, an example 14 includes a method of calibrating a pump including adjusting pump duty cycle until a target total flow rate in a system is achieved, determining pressure at each flow control device of the system, determining a minimum pressure for each flow control device and adjusting pump duty cycle until the minimum pressure is achieved for each flow control device when pressure is below a minimum pressure for each flow control device.

An example 15 includes the subject matter of the example 14 and further comprises determining an amount that each flow control device is open and adjusting the pump duty cycle until each flow control device is not at or beyond a maximum open position if any flow control device is at or beyond a maximum open position.

An example 16 includes the subject matter of the example 15, wherein the method determines a duty cycle for the target total flow rate that is a maximum flow rate.

An example 17 includes the subject matter of the example 16, wherein determining the duty cycle comprises a calibration to determine a minimum duty cycle of the pump needed to achieve each of the target total flow rate, a minimum pressure for each flow control device, and each flow control device not being at or beyond a maximum open position.

In another embodiment, example 18 is a pump system, comprising at least one fluid storage for storing a liquid to be applied to a field, a plurality of application lines each having a flow control device, a pump to control a flow of the liquid to the flow control devices, and a controller to control the pump. The controller to adjust pump duty cycle until a target total flow rate in the pump system is achieved and to adjust pump duty cycle until a minimum pressure is achieved for each flow control device when pressure is below a minimum pressure for any flow control device.

An example 19 includes the subject matter of the example 18, wherein the controller to adjust the pump duty cycle until each flow control device is not at or beyond a maximum open position if any flow control device is at or beyond a maximum open position.

An example 20 includes the subject matter of any of examples 18 and 19, wherein the controller to determine a minimum duty cycle of the pump needed to achieve the target total flow rate, a minimum pressure for each flow control device, and each flow control device not being at or beyond a maximum open position.

What is claimed is:

1. A method of calibrating a pump comprising:
    adjusting pump duty cycle until a target total flow rate in a system is achieved, wherein the system comprises a plurality of application lines each having a flow control device, and the pump to control a flow of a liquid to the flow control devices;
    determining pressure at each flow control device of the system after the target total flow rate in the system is achieved;
    determining a minimum pressure for each flow control device to maintain a total flow rate at the target total flow rate; and
    adjusting pump duty cycle until the minimum pressure is achieved for each flow control device when the determined pressure is below a minimum pressure for any flow control device to calibrate the pump.

2. The method of claim 1, wherein the method determines a duty cycle for the target total flow rate that is a maximum flow rate.

3. A pump system, comprising:
    at least one fluid storage for storing a liquid to be applied to a field;
    a plurality of application lines each having a flow control device;
    a pump to control a flow of the liquid to the flow control devices; and
    a controller to control the pump, the controller to adjust pump duty cycle until a target total flow rate in the pump system is achieved, to determine pressure at each flow control device after the target total flow rate in the pump system is achieved, to determine a minimum pressure for each flow control device to maintain a total flow rate at the target total flow rate, and to adjust pump duty cycle until the minimum pressure is achieved for each flow control device when the determined pressure is below a minimum pressure for any flow control device to calibrate the pump.

4. The pump system of claim 3, wherein the target total flow rate is a maximum flow rate.

5. The method of claim 1, wherein the target total flow rate is a minimum flow rate.

6. The method of claim 1, further comprising:
    adjusting pump duty cycle until a position of each flow control device is not at or beyond a maximum open position.

7. The method of claim 6, wherein the calibration of the pump determines a minimum duty cycle of the pump to achieve each of target total flow rate, minimum pressure for each flow control device to maintain a total flow rate at the target total flow rate, and each flow control device not at or beyond a maximum open position.

* * * * *